US006188506B1

(12) United States Patent
Kaiserman et al.

(10) Patent No.: US 6,188,506 B1
(45) Date of Patent: Feb. 13, 2001

(54) CONDUCTIVE COLOR-CHANGING INK

(75) Inventors: Terrance Z. Kaiserman, Loxahatchee, FL (US); Andrew R. Ferber, New York, NY (US); Adrian I. Rose, Gillette, NJ (US)

(73) Assignee: Colortronics Technologies L.L.C., East Newark, NJ (US)

( * ) Notice: Under 35 U.S.C. 154(b), the term of this patent shall be extended for 0 days.

(21) Appl. No.: 09/181,162

(22) Filed: Oct. 28, 1998

Related U.S. Application Data

(60) Provisional application No. 60/064,869, filed on Nov. 5, 1997.

(51) Int. Cl.$^7$ .................................................. G02F 1/01
(52) U.S. Cl. ............................................... 359/288
(58) Field of Search ..................... 359/288, 289; 349/199

(56) References Cited

U.S. PATENT DOCUMENTS

| | | | |
|---|---|---|---|
| 4,028,118 | 6/1977 | Nakasuji et al. | 106/31.19 |
| 4,032,687 | 6/1977 | Hornsby, Jr. | 428/1.61 |
| 4,142,782 | * 3/1979 | O'Brian | 359/288 |
| 4,360,780 | 11/1982 | Skutch, Jr. | 324/437 |
| 4,379,816 | 4/1983 | Mullersman et al. | 429/91 |
| 4,497,881 | 2/1985 | Bertolino | 429/91 |
| 4,702,563 | 10/1987 | Parker | 349/199 |
| 4,702,564 | 10/1987 | Parker | 349/199 |
| 4,725,462 | 2/1988 | Kimura | 428/29 |
| 4,726,661 | 2/1988 | Parker | 349/199 |
| 4,727,006 | 2/1988 | Malinowski et al. | 429/50 |
| 4,737,020 | 4/1988 | Parker | 349/199 |
| 4,835,475 | 5/1989 | Hanakura et al. | 324/435 |
| 4,835,476 | 5/1989 | Kurosawa | 324/435 |
| 5,015,544 | 5/1991 | Burroughs et al. | 429/93 |
| 5,059,895 | 10/1991 | Cataldi et al. | 324/104 |
| 5,156,931 | 10/1992 | Burroughs et al. | 429/93 |
| 5,371,657 | 12/1994 | Wiscombe | 362/103 |
| 5,466,654 | * 11/1995 | Akutsu et al. | 503/206 |

FOREIGN PATENT DOCUMENTS 1-281931 * 1/1989 (JP).
1-221265 * 9/1989 (JP).
1-221266 * 9/1989 (JP).

* cited by examiner

*Primary Examiner*—Ricky Mack
(74) *Attorney, Agent, or Firm*—Lerner, David, Littenberg, Krumholz & Mentlik, LLP

(57) ABSTRACT

A conductive composition is disclosed. The conductive composition comprises a thermochromic material and a conductive material dispersed in a resin. An electrical system is also disclosed which incorporates the conductive composition in combination with a power source.

18 Claims, No Drawings

CONDUCTIVE COLOR-CHANGING INK

This application claims priority on provisional patent application Ser. No. 60/064,869, which was filed on Nov. 5, 1997.

FIELD OF THE INVENTION

The present invention relates to thermochromic compositions. The present invention also relates to electrically conductive compositions such as conductive inks and the like.

BACKGROUND OF THE INVENTION

Thermochromic dyes are known for use in various applications including electrical systems applications. For example, thermochromic dyes have been used as a voltmeter in the prior art to determine the signal strength of batteries. In such an application, a thermochromic dye containing layer may be arranged in contact with an electrically conductive layer which extends between positive and negative electrodes of a battery. A switch would be used to open and close a current flow path so that when the switch is in a closed position, current from the battery is permitted to flow between the positive and negative electrodes through the conductive layer. Heat is generated as the current flows through the conductive layer thus activating the thermochromic dye in the adjacent layer so that a color change is obtained. Such a prior art system has shortcomings as it requires entirely separate layers of thermochromic ink and conductive materials. The separate layers contribute to increased manufacturing costs and printing steps. Further, problems may arise due to separation of the various layers. Examples of such prior art systems are disclosed in U.S. Pat. Nos. 5,059,895 to Capaldi et al.; 5,015,544 to Burroughs et al.; 4,835,476 to Kurosawa; and 4,835,475 to Hanakura et al.

The prior art also discloses the use of thermochromic materials for coating color changing designs onto substrates. For example, U.S. Pat. No. 4,028,118 to Nakasuji et al. teaches that color changing thermochromic compositions may be applied to the surface of a circuit board or machine and activated by heat generation caused by overloads in the electrical circuits or electrical machines to provide a warning of an overload condition. It is also disclosed that color changes could be used to hide or reveal a background for a display, exhibition, advertisement, teaching material, toy, magnetic device, or the like. As with the other prior art patents discussed above, the '118 patent requires a separate thermochromic layer in contact with a conductive material. All of the foregoing prior art systems have the shortcoming of requiring thermochromic compositions to be used in conjunction with at least one additional separate layer of conductive material. The present invention overcomes this shortcoming.

SUMMARY AND OBJECTS OF THE INVENTION

In one aspect of the present invention, a conductive composition is provided. The conductive composition preferably comprises a thermochromic material and a conductive material dispersed in a resin. The resin, the thermochromic material and the conductive material can therefore be applied as a single composition layer. It should be appreciated that as used herein, the term "resin" is intended to include materials conventionally known as resins, binders or adhesives.

Preferably, the thermochromic material is present in an amount sufficient to affect a noticeable color change in response to a predetermined temperature when heat is applied thereto. In another preferred embodiment, the amount of heat required to activate the color changing properties of the thermochromic material is greater than room temperature. In another preferred embodiment, the amount of heat required to activate the thermochromic material to change colors is greater than normal skin temperature. In yet another preferred embodiment, the amount of heat required to activate the thermochromic material to change colors is greater than about 99 degrees F. In still another embodiment, the conductive composition is capable of changing a plurality of colors in response to a predetermined number of different temperatures. Alternatively, either discreet areas or expanding areas will respond with a color change responsive to an increased resistance and increased heat.

The conductive material of the composition is preferably present in an amount sufficient to permit electrical current to flow therethrough so that an associated circuit component can be activated. At the same time, it is desirable for the conductive composition to have a preselected resistivity selected so that heat will be generated as electrical current flows through the conductive material. The heat generated by the flow of electrical current through the conductive material would preferably be sufficient to activate the thermochromic material to change color.

It is also preferable for the resin of the conductive composition to be selected from the group consisting of urethanes, acrylics, phenolics, epoxies and other oxidizing materials. The thermochromic materials may be encapsulated or nonencapsulated and may include cholosteric liquid crystal. The combination of the properties of the resin and the conductive materials, as well as their respective properties and the properties and proportion of the thermochromic material, can be used to modify the resistivity of the composition and, therefore, the amount of heat generated when current flows therethrough. This can be used, along with the selection of the appropriate thermochromic dyes, to adjust the temperature/color response of the resulting materials.

The conductive material of the present invention may include various conductors including precious metals, non-precious metals, conductive polymers and the like. Various conductive materials are disclosed in U.S. Pat. No. 5,626,948, such disclosure being incorporated by reference herein. The conductive composition of the present invention may also include a pigment. Suitable pigments may be organic or inorganic and are also disclosed in the '948 patent, which has been incorporated by reference herein.

In another preferred embodiment, the conductive composition of the present invention may include a defoamer such as silicone or non-silicone surfactants or solvents.

In yet another preferred embodiment, the present conductive composition may comprise a thickener which is described herein as any product that can change the flow or rheological characteristics of the subject composition.

Preferable ranges by weight of the materials which may be present in the conductive composition are as follows:

Resin—from 5% to 60%
Defoamer—from 0% to 5%
Thermochromic—from 2% to 75%
Conductor—from 10% to 60%

Solvents—from 0% to 50%

Thickener—from 0% to 10%

Reducer—from 0% to 50%

Pigment—from 0% to 10%

In a particularly preferred formulation, the resin may comprise about 38.7% of the conductive composition. The thermochromic material may comprise 31% of the conductive composition. The conductive material may comprise about 22.6% of the conductive composition, and the pigment may comprise about 7.7% of the conductive composition.

In another preferred formulation, the resin may comprise about 20% of the conductive composition while the thermochromic and conductive materials may comprise about 40% of the conductive composition.

The conductive composition of the present invention may also include a reducer, which is described herein as any product that thins the composition, such as water or other compounds.

In accordance with another aspect of the present invention, an electrical system is provided. The electrical system comprises a substrate, a conductive composition arranged on a substrate, a power source having a positive terminal and a neutral terminal wherein the conductive composition is arranged between the positive and neutral terminals of the power source. In a preferred embodiment, the electrical system may also comprise a switch for selectively opening and closing a circuit that will permit current to flow from the power source through the conductive composition. In yet a further embodiment, the electrical system may comprise a current operated module responsive to current flow generated from the power source. The conductive composition in accordance with this aspect of the invention, may include the materials and features discussed above.

Accordingly, it is an object of the present invention to provide a conductive composition comprising both electrically conductive materials and thermochromic materials dispersed in a resin. The conductive composition may also include thermally conductive materials.

It is a further object of the present invention to provide a conductive composition comprising both conductive materials and thermochromic materials in a single composition layer.

It is yet another object of the present invention to provide an electrical system incorporating a conductive composition comprising a thermochromic material and a conductive material dispersed in a resin wherein the thermochromic material has color changing properties that may be activated in response to heat generated by current flowing through the conduction material thereof.

These and other objects, features and advantages of the present invention will be more readily understood when considered in view of the following detailed description of the preferred embodiments.

DETAILED DESCRIPTION OF THE PREFERRED EMBODIMENTS

A single layer of the composition of the present invention comprises both conductive and thermochromic materials dispersed in a resin layer. Such a composition is both novel and unobvious over materials and systems known in the prior art. It will permit thermochromic compositions to be applied to substrates in a single layer, as opposed to two or more layers, and will therefore provide much more efficient application and manufacturing techniques than as heretofore been achieved.

Various coating methods can be used to apply the conductive composition to the surface of a substrate. Such coating methods include screen printing, gravure, flexo, offset printing, spray coating, knife coating, electrostatic coating, reverse role coating and various other coating methods, such as those discussed in U.S. Pat. No. 5,626,948, the subject matter of which has been incorporated by reference herein. The conductive composition is preferably a conductive ink which also contains a thermochromic compound either encapsulated or non-encapsulated. When current is passed through the conductive composition, the color of the coating will change in appearance due to heat generated as current flows through the conductive materials of the composition.

The appearance change is due to the ability of the conductive coating to increase in temperature when current is applied because of its resistance. The thermochromic component, which can be selected from various activation temperature ranges, changes color when the internal temperature reaches a predetermined temperature. That change can be in the form of changing from one color to another or from a color to colorless or visa versa. By mixing in colors that are not effected by relatively low temperature change, the visible heated color, or the normal color, is the color of all the components other than the thermochromic color (unless the thermochromic material starts as a colored material and changes color at a certain temperature). When heat is dissipated below the activation threshold of the thermochromic material, the color may revert back to the normal ambient color of the thermochromic material.

The range of temperatures generated can also be modified by changing the nature and proportions of the conductive material, resin and/or thermochromic material. For example, it may be desirable to use a certain thermochromic dye which is only activated at relatively high temperatures. The system will generally not carry sufficient current, even at overload, to activate a color change. Increasing the resistance of the composition, however, could be used to overcome this problem by raising the normal operating temperature to a point where an overload would cause a color change.

The thermochromic material may be selected as one which returns to its original color after its cools below its activation temperature. Alternatively, the thermochromic material may be selected as one which obtains a permanent change after it is heated above its activation temperature. Such an effect is known as historisis. Multiple colors may be used as well. For example, a dye giving a yellow color may be activated at one temperature and a blue dye may be activated at a second temperature resulting in a green color change when the second temperature is realized. The layer can also be divided so that independent regions turn different colors at different temperatures.

The conductive composition of the present invention could be used as a decorative coating on various flexible or rigid substrates. Such substrates may include, but are not limited to, textiles, polymeric films, fibrous materials such as paper or the like, metals, ceramics, wooden materials and various other substrates. In a preferred embodiment, the conductive composition would be flexible and would include one or more pigments to obtain a desired color. The conductive composition may also be washable.

In one example, the conductive composition of the present invention may be used as a voltmeter for a battery. Such a use would have advantages over prior art uses in that it may be applied as a single layer to save both material costs and to expedite manufacturing and assembly operations.

The present conductive composition may also be used as a voltmeter or current meter or heat indicator in various other electrical applications. Again, it provides advantages over prior art meters which use thermochromic materials in that it can be applied as a single composition.

The resin of the present composition may be useful as a vehicle in which the conductive materials and thermochromic materials are dispersed, as well as an adherent to the surface of various substrates.

When the conductive composition of the present invention is used in an electrical circuit which requires activation of one or more current operated modules, the conductive material should be selected to permit sufficient current to flow to activate such modules. At the same time, it is desirable for the resistivity of the conductive material to be selected so that sufficient heat would be generated to activate the color changing properties of the associated thermochromic material. The conductive material, dye and resin may also be produced in a gradient as may be desirable when the present conductive composition is used as a voltmeter in battery testing environments. In another example, the region of color change may spread with an increase in temperature.

In another example, the conductive composition of the present invention may be applied to the surface of wearing apparel such as t-shirts or the like. In this application, the conductive composition of the present invention may be printed as a portion of a design on a t-shirt. Examples of such an application are further disclosed in U.S. Pat. No. 5,455,749, the subject matter of which is incorporated by reference herein. However, in this new application, as current flows through the conductive material, a sufficient amount of heat is generated so that color changing properties of the associated thermochromic material is activated. When current stops flowing, the conductive composition may cool back to its ambient temperature thus, permitting the thermochromic material to return to its original color.

In yet another example, the conductive composition of the present invention may be used for the purpose of providing heat to a substrate such as a fabric. In particular, the conductive composition may be used to create heated shirts, pants, socks, blankets, cushions, back supports, seats, etc.

The conductive composition of the present invention may be used in combination with countless other electrical systems where color changing properties are desired. Examples of certain preferred formulations of conductive compositions in accordance with the present invention are set forth above. The materials of the conductive composition are preferably compatible with each other so as to reduce the risk of mechanical or chemical breakdown.

It should be appreciated that the foregoing detailed description of the preferred embodiments is provided by way of example only as the scope of the present invention is set forth in the claims which follow.

We claim:

1. A conductive composition comprising: a thermochromic material and a conductive material dispersed in a resin, said thermochromic material comprises an ambient color and at least a second color, said thermochromic material being present in an amount of between 2%–75% by weight so that said ambient color changes to said second color in response to a sufficient amount of heat applied thereto.

2. The conductive composition of claim 1 further comprising a thickener.

3. The conductive composition of claim 1 wherein said conductive material is present in an amount of between 10%–60% by weight so that a sufficient level of electrical current can flow therethrough whereby an associated circuit component is activated to a desired state.

4. The conductive composition of claim 1 wherein said resin is selected from the group consisting of urethanes, acrylics, phenolics, epoxies and other oxidizing materials.

5. The conductive composition of claim 1 wherein said thermochromic material is selected from the group consisting of encapsulated and nonencapsulated materials.

6. The conductive composition of claim 5 wherein said thermochromic material comprises cholosteric liquid crystal.

7. The conductive composition of claim 1 wherein said conductive material comprises a precious metal or non-precious metal.

8. The conductive composition of claim 1 further comprising a pigment.

9. The conductive composition of claim 8 wherein said pigment is organic.

10. The conductive composition of claim 8 wherein said pigment is inorganic.

11. The conductive composition of claim 1 further comprising a defoamer.

12. The conductive material of claim 11 wherein said defoamer comprises silicone or non-silicone surfactants or solvents.

13. The conductive composition of claim 1 further comprising a reducer.

14. An electrical system comprising: a substrate; conductive composition arranged on said substrate, said conductive composition including a thermochromic material and a conductive material dispersed in a resin, said thermochromic material comprises an ambient color and at least a second color, said thermochromic material being present in an amount of between 2%–75% by weight so that said ambient color changes to said second color in response to a sufficient amount of heat applied thereto; and a power source connected to said conductive composition whereby current can flow from said power source through said conductive composition.

15. The electrical system of claim 14 wherein said thermochromic material is selected from the group consisting of encapsulated and nonencapsulated material.

16. The electrical system of claim 14 further comprising a switch electrically connected to said conductive composition for permitting current to selectively flow from said power source through said conductive composition.

17. The electrical system of claim 14 further comprising a current operated module responsive to current permitted to flow from said power source.

18. The electrical system of claim 17 wherein said current operated module comprises a sound or light producing device.

* * * * *